United States Patent Office 3,266,570
Patented August 16, 1966

3,266,570
RECOVERY OF PETROLEUM BY DISPLACEMENT WITH MISCIBLE FLUIDS
William B. Gogarty, Littleton, Colo., assignor to Marathon Oil Company, Findlay, Ohio, a corporation of Ohio
No Drawing. Filed May 27, 1963, Ser. No. 283,578
9 Claims. (Cl. 166—9)

This invention relates to secondary type recovery of petroleum fluids from subterranean reservoirs and more particularly to a process wherein a slug of soluble oil is injected into a petroleum-containing subterranean formation, a slug of an emulsion is injected into the formation, these slugs are displaced through the formation by a water drive, and petroleum is recovered from the formation.

Secondary oil recovery techniques have evolved from the use of a simple water drive to the use of multiple slugs of materials. The use of multiple slugs was inaugurated to improve the viscosity or miscibility characteristic of the flood. While the use of the prior slugs or bank materials appreciably increased the unit displacement efficiency of the flooding technique, recovery costs were often increased to the extent that the operator found it more profitable to utilize substantially pure water as the flooding material.

In the process of this invention, problems of miscibility and viscosity are overcome. The use of an oil-external soluble oil eliminates the problem of slug miscibility with the crude in the formation. Following the soluble oil with a water-external emulsion eliminates difficulties relative to miscibility at the soluble oil-emulsion interface and at the interface between the water drive fluid and the emulsion. The viscosity of the emulsion can be graduated from that of the soluble oil to that of water by gradually increasing the amounts of water in the emulsion, thereby overcoming viscosity problems inherent in most processes. Furthermore, the use of soluble oils and emulsions containing large amounts of water aids in overcoming the economic problems inherent in other miscible flood recovery procedures.

As previously indicated, the process of this invention comprises injecting a slug of soluble oil into an oil-containing formation, following this slug with a slug of emulsion, and finally forcing these slugs through the formation with a water drive.

The soluble oils and emulsions have differing characteristics in the effect of water on their viscosity, their light transmission, and other properties though they can be made of differing amounts of the same materials.

The soluble oils are also substantially clear liquids while emulsions are turbid to opaque. Soluble oils and emulsions are similar in that both can have high oil concentrations, but only the soluble oil will invert readily to form a water-external emulsion.

Surfactants which can be utilized to prepare soluble oils and emulsions useful in my process include the various nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyldiethyleneglycol sulfate, monobutylphenyl phenol sodium sulfate, and triethanolamine laurate or triethanolamine oleate.

I prefer to utilize anionic surfactants such as higher alkylaryl monosulfonates, particularly alkylarylnaphthenic monosulfonates, wherein the alkyl radical contains from about 5 to 20 carbon atoms. The sodium salts of dialkylsuccinates are also particularly desirable surfactants for use in making up the slug materials. It is preferred that the alkyl radicals of the succinate compounds contain from about 6 to about 10 carbon atoms.

The type of surfactant utilized depends upon the temperature of the formation and the hardness, including salinity, and pH of the connate water and the water used to make up the bank materials. It would be futile to use a detergent such as sodium oleate in a formation containing relatively high concentrations of calcium and magnesium ions, as the precipitated calcium and magnesium soaps would plug the formation. Similarly, where there is a natural detergent in the crude, a surfactant having a similar ionic charge must be used to avoid precipitating an insoluble reaction product. Furthermore, it is obvious that when slugs or bank materials composed of the above-setout components are utilized in a particular subterranean oil-bearing formation that the emulsion or soluble oil must be stable at formation temperatures and pressures.

The water utilized in preparing the soluble oil and emulsion slugs is preferably soft. However, ordinary hard tap water and even relatively brackish waters can be used with detergents which are stable to the contaminating ions.

The techniques utilized in preparing soluble oils are similar to those utilized in preparing emulsions. Like emulsions, the soluble oils separate into two phases when improperly prepared and allowed to stand. They are generally prepared by dissolving surfactant in the petroleum constituent, the water or both. Preferably, the surfactant and any coupling agents, such as lower molecular weight aliphatic alcohols, are dissolved in the petroleum constituent and water is added to the petroleum fraction incrementally with agitation.

In a preferred process, the soluble oil slug is injected into the formation and followed by an emulsion slug. The viscosity of the soluble oil should be about that of the crude petroleum in the formation. A portion or all of the emulsion slug may be incrementally reduced in viscosity from the viscosity of the soluble oil at the soluble oil-emulsion interface to the viscosity of water at the trailing edge of the emulsion slug. The gradual reduction in viscosity is accomplished by the incremental addition of increasing amounts of water to the emulsion slug.

Normally, from about 1 to about 20% of the formation pore volume of combined soluble oil and emulsion slugs is necessary to effect good oil recoveries. Preferably, 2–10% combined slugs are used. The amount of combined slug required varies with the acreage to be flooded. Slug volumes of 2.5–5% of pore volume are adequate to flood a 40–50 acre area, while 5–10% of pore volume are necessary for a 3–5 acre area.

The combined slug volumes can be divided as desired, though the soluble oil slugs should comprise about 5–50%, by volume, of the total of soluble oil and emulsion slugs and preferably about 10–30% of the total combined slugs.

In a preferred process, a soluble oil comprising 24% water, 61.1% hydrocarbon, 3.8% isopropanol, and 11.1% of an alkylnaphthenic monosulfonate having an empirical formula approximating $C_nH_{2n-10}SO_3Na$, wherein $n=25$–$30$ and the alkyl radical contains from about 5 to about 20 carbon atoms, is injected into a subterranean formation. The soluble oil slug is followed by an emulsion slug containing 60% water, 32.2% hydrocarbon, 2% isopropanol, and 5.8% sulfonate. A trailing edge of tapered viscosity was then injected into the formation by continuous and increasing dilution of a portion of the emulsion slug material with water. The micellar slugs (the soluble oil and emulsion slugs) are driven through the formation by injecting water into the formation through the wells utilized to inject the micellar slugs. The total slugs comprise about 2.5–10% of the total pore volume.

The following example more fully illustrates my invention, but it is not intended that the invention be limited to the slug materials, well depth, percentages of composition, etc., shown. Rather, it is intended that all equivalents obvious to those skilled in the art be included within the scope of my invention as claimed.

*Example I*

Through the four exterior wells of a five-spot pattern, 5,350 barrels of a soluble oil were injected into a Pennsylvanian sand located in the Illinois Basin at a depth of 950 feet. The soluble oil has a viscosity of 9.1 cps. and was composed of 61.1% straight run gasoline, 24% water, 3.8% isopropanol, and 11.1% alkylarylnaphthenic monosulfonate sold by Shell Chemical Company. The sand section was about 10 feet in thickness, had a permeability of 150 md., an initial oil saturation of 50–55%, water saturation of 23–27%, and gas and voids saturation of 18–27% of the pore volume. The crude viscosity was about 11.5 cps. at 21° C. The oil-external slug was injected at a rate of between 150 and 250 bbls./day and followed by 10,073 barrels of a water-external emulsion injected at a rate of from about 150 to about 250 bbls./day. The emulsion had the composition 60.0%, by volume, water; 32.2% straight run gasoline; 5.8% alkylarylnaphthenic monosulfonate; and 2.0% isopropanol. The initial portion of the emulsion slug had as viscosity of about 10.9 cps., and the trailing edge of the emulsion slug had a viscosity of approximately that of water.

Water was then injected into the formation at the rate of 60–150 bbls./day. Prior to the above treatment, production from the five-spot was less than about 1 bbl./day. The production has gradually increased and now is at the rate of about 8 bbls./day water and about 7 bbls./day oil. The sweep of the formation within the test five-spot should be completed within 480 days from initiation of the flood, whereas in the ordinary water flood, the flooding operation would require about 750 days. In the above-described process, it is estimated that 0.9 total pore volume of soluble oil, emulsions, and water will be required to sweep the formation, whereas normally about 1.4 to 2.0 pore volumes of water would be required for the same purpose in the typical water flood.

Now having described my invention, what I claim is:

1. The process for the recovery of fluid petroleum hydrocarbons from hydrocarbon-bearing formations comprising
   (a) injecting into the formation, through at least one injection well drilled into the formation, a slug of soluble oil;
   (b) injecting into the formation a slug of emulsion;
   (c) injecting into the formation water in amounts effective to drive the soluble oil and emulsion through the formation; and
   (d) recovering, through at least one production well drilled into the formation, petroleum.

2. The process of claim 1 wherein from about 1 to about 20% of the formation pore volume of combined soluble oil and emulsion slugs is injected into the formation.

3. The process of claim 1 wherein the viscosity of the soluble oil is substantially that of the hydrocarbon in the formation, the leading edge of the emulsion has a viscosity substantially that of the soluble oil, and the trailing edge of the emulsion has a viscosity which is approximately that of water.

4. The process of claim 1 wherein from about 2 to about 10% of the formation pore volume of combined soluble oil and emulsion slugs is injected into the formation.

5. The process of claim 4 wherein the soluble oil slug comprises from about 5 to about 50%, by volume, of the total volume of soluble oil and emulsion slugs.

6. The process for the recovery of fluid petroleum hydrocarbons from hydrocarbon-bearing formations comprising
   (a) injecting into the formation, through at least one injection well drilled into said formation, a slug of soluble oil comprising about 24% water, about 61% hydrocarbon, about 4% isopropanol, and about 11% of an alkylarylnaphthenic monosulfonate;
   (b) subsequently injecting into the formation an emulsion containing about 60% water, about 32% hydrocarbon, about 2% isopropanol, and about 6% of an alkylarylnaphthenic monosulfonate;
      at least a portion of said emulsion slug being incrementally diminished in viscosity from substantially that of the soluble oil to about that of water at the trailing edge of the emulsion slug;
   (c) after injection of the soluble oil and emulsion slug injecting into the formation water; and
   (d) recovering oil from said formation through at least one production well drilled into said formation.

7. The process of claim 6 wherein the total slug volume comprises about 2.5–10% of the total pore volume of the area from which oil is to be recovered.

8. The process of claim 6 wherein the soluble oil slug comprises from about 5 to about 50%, by volume, of the total volume of the soluble oil and emulsion slugs.

9. The process of claim 6 wherein the soluble oil comprises from about 10 to about 30% of the total volume of the soluble oil and emulsion slugs.

References Cited by the Examiner

UNITED STATES PATENTS

| | | | |
|---|---|---|---|
| 2,867,277 | 1/1959 | Weinaug | 166—9 |
| 2,988,142 | 6/1961 | Maly | 166—9 |
| 3,149,669 | 6/1964 | Binder et al. | 166—9 |
| 3,163,214 | 12/1964 | Csaszar | 166—9 |

CHARLES E. O'CONNELL, *Primary Examiner.*

C. H. GOLD, T. A. ZALENSKI, *Assistant Examiners.*